(12) United States Patent
Wilensky

(10) Patent No.: US 8,264,500 B2
(45) Date of Patent: *Sep. 11, 2012

(54) IMAGE MASKS GENERATED FROM LOCAL COLOR MODELS

(75) Inventor: Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/224,088

(22) Filed: Sep. 1, 2011

(65) Prior Publication Data
US 2011/0311134 A1    Dec. 22, 2011

Related U.S. Application Data

(63) Continuation of application No. 11/607,206, filed on Dec. 1, 2006, now Pat. No. 8,013,870.

(60) Provisional application No. 60/847,168, filed on Sep. 25, 2006.

(51) Int. Cl.
*G09G 5/02* (2006.01)
*G09G 5/00* (2006.01)

(52) U.S. Cl. ........................................ 345/592; 345/611

(58) Field of Classification Search .................. 345/592, 345/611–616
See application file for complete search history.

(56) References Cited

U.S. PATENT DOCUMENTS

| | | | |
|---|---|---|---|
| 5,917,937 A | 6/1999 | Szeliski et al. | |
| 5,951,713 A | 9/1999 | Liguori | |
| 5,982,939 A | 11/1999 | Van Hook | |
| 6,078,619 A | 6/2000 | Monro et al. | |
| 6,337,925 B1 | 1/2002 | Cohen et al. | |
| 6,404,936 B1 | 6/2002 | Katayama et al. | |
| 6,876,361 B2 | 4/2005 | Venkataraman | |
| 6,894,704 B1 | 5/2005 | Bourdev et al. | |
| 2004/0008886 A1 | 1/2004 | Boykov | |
| 2004/0100477 A1 | 5/2004 | Morita et al. | |
| 2006/0055709 A1 | 3/2006 | Robinson | |
| 2006/0159342 A1 | 7/2006 | Sun et al. | |

OTHER PUBLICATIONS

Boykov, Y. et al., "Interactive Organ Segmentation Using Graph Cuts," Medical Image Computing and Computer-Assisted Intervention, MIC CAI 2000 Lecture Notes in Computer Science; LNCS, Springer-Verlag, BE, vol. 1935, Jan. 1, 2004, pp. 276-286.

Tan, K. et al., "A representation of image structure and its application to object selection using freehand sketches," Proceedings 2001 IEEE Conference on Computer Vision and Pattern Recognition. CVPR 2001. Dec. 8-14, 2001; vol. 2, Dec. 8, 2001, pp. 677-683.

Tan, K. et al., "Selecting objects with freehand sketches," Proceedings of the Eight IEEE International Conference on Computer Vision (ICCV), Vancouver, British Columbia, CA, Jul. 7-14, 2001; vol. 1, Jul. 7, 2001, pp. 337-444.

(Continued)

*Primary Examiner* — Aaron M Richer
(74) *Attorney, Agent, or Firm* — Fish & Richardson P.C.

(57) ABSTRACT

Methods, systems, and apparatus, including computer program products, feature receiving an image mask where the image mask identifies a first opacity value of pixels in a raster image. The first opacity value ranges between a value representing foreground and a value representing background. Each pixel in the image has a color. A first boundary pixel is identified in the image. A second opacity value for the first boundary pixel is determined using a first local color model of opacity. The first local color model of opacity is determined based on the colors of the pixels in the image within a local neighborhood of the first boundary pixel.

16 Claims, 9 Drawing Sheets
(2 of 9 Drawing Sheet(s) Filed in Color)

OTHER PUBLICATIONS

International Search Report for PCT Application No. PCT/US2007/074022 mailed Jun. 27, 2008.

Boykov, Y. et al., "Interactive Graph Cuts for Optimal Boundary & Region Segmentation of Objects in N-D Images", *Proceedings of "International Conference on Computer Vision"*, vol. I, pp. 105-112, Vancouver, Canada (Jul. 2001).

Collins, T., "Graph Cut Matching in Computer Vision", 9 pages [online], Feb. 2004. Retrieved from the Internet:<URL: http://homepages.inf.ed.ac.uk/rbf/CVonline/LOCAL_COPIES/AV0405/COLLINS/TobyCollinsAVAssign2.pdf> on Oct. 26, 2006.

Geman, S. et al., "Stochastic Relaxation, Gibbs Distributions, and the Bayesian Restoration of Images", *IEEE Transactions on Pattern Analysis and Machine Intelligence*, vol. PAMI-6, No. 6, pp. 721-741 (Nov. 1984).

Kohli, P. et al., "Efficiently Solving Dynamic Markov Random Fields using Graph Cuts", , *Proceedings of the Tenth IEEE International Conference on Computer Vision*, 8 pages [online], 2005. Retrieved from the Internet: <URL: http://cms.brookes.ac.uk/staff/PushmeetKohli/papers/pushmeet-dynamic.pdf> on Oct. 26, 2006.

Levin, A. et al., "A Closed Form Solution to Natural Image Matting", *IEEE Conf. on Computer Vision and Pattern Recognition (CVPR)*, New York, 8 pages [online], Jun. 2006. Retrieved from the Internet: <URL: http://www.cs.huji.ac.il/~alevin/papers/Matting-Levin-Lischinski-Weiss-CVPR06.pdf> on Oct. 26, 2006.

Levin, A. et al., "Colorization using Optimization", *SIGGRAPH, ACM Transactions on Graphics*, 6 pages [online], Aug. 2004. Retrieved from the Internet: <URL: http://www.cs.huji.ac.il/~alevin/papers/colorization-siggraph04.pdr> on Oct. 26, 2006.

Lombaert, H. et al., "A Multilevel Banded Graph Cuts Method for Fast Image Segmentation", *Proceedings of the Tenth IEEE International Conference on Computer Vision (ICCCV'05)*, vol. 1, pp. 259-265 (2005).

Morse, Bryan S., et al., "Image Magnification Using Level-Set Reconstruction." Department of Computer Science, Brigham Young University 3361 TMCB, Provo, UT 84602, 8 pages.

Mortensen, E. et al., "Interactive Segmentation with Intelligent Scissors", *Graphical Models and Image Processing*, vol. 60, pp. 349-384 (1998).

Mortensen, E., "Simultaneous multi-frame subpixel boundary definition using toboggan-based intelligent scissors for image and movie editing—A dissertation submitted to the faculty of Brigham Young University for the degree of Doctor of Philosophy", Department of Computer Science, Brigham Young University, pp. 105-153 (Sep. 2000).

Reese, L., "Intelligent Paint: Region-Based Interactive Image Segmentation—A thesis submitted to the faculty of Brigham Young University for the degree of Master of Science", Department of Computer Science, Brigham Young University, 157 pages (Aug. 1999).

Rother, C. et al., "GrabCut—Interactive Foreground Extraction using Iterated Graph Cuts", ACM Transactions on Graphics (SIGGRAPH'04), Microsoft Research Cambridge, UK, 6 pages [online], 2004. Retrieved from the Internet: <URL: http://research.microsoft.com/vision/cambridge/papers/siggraph04.pdf> on Oct. 26, 2006.

Sethian, J. A., "Level Set Methods and Fast Marching Methods." Cambridge University Press, 1999. p. 73-74.

Wang, J. et al., "An Iterative Optimization Approach for Unified Image Segmentation and Matting", *Proceedings of the Tenth IEEE International Conference on Computer Vision (ICCCV'05)*, 8 pages (2005).

Wilensky, G. et al., "Image Mask Generation", Pending U.S. Appl. No. 11/524,219, filed Sep. 19, 2006.

Wilensky, G. et al., "Live Coherent Image Selection", Pending U.S. Appl. No. 11/517,189, filed Sep. 6, 2006.

Xiao, J. et al., "Motion Layer Extraction in the Presence of Occlusion using graph Cut", *Oral Presentation at the IEEE Conference on Computer Vision and Pattern Recognition, CVPR* 2004, 8 pages (2004).

Saad, Yousef, "Iterative Methods for Sparse Linear Systems," PWS Publishing Company, a division of International Thomson Publishing, Inc. (1996).

International Search Report for PCT Application No. PCT/US07/7880 mailed Apr. 3, 2008.

International Preliminary Report on Patentability for PCT International Application No. PCT/US2007/078807, mailed Mar. 24, 2009, 6 pages.

Eismann, Katrin "Photoshop Masking & Compositing", Publisher: New Riders Press (Oct. 18, 2004), 11 pages.

Evening, Martin "Adobe Photoshop CS2 for Photographers", Publisher: Focal Press (2005), 24 pages.

International Preliminary Report on Patentability for PCT Application No. PCT/US2007/074022, mailed Jan. 27, 2009, 9 pages.

International Search Report and Written Opinion for PCT Application No. PCT/US2007/79090, mailed Sep. 16, 2008, 17 pages.

Mumford, D. et al., "Optimal Approximations by Piecewise Smooth Functions and Associates Variational Problems," Communication on Pure and Applied Mathematics, vol. XLII, pp. 577-685 (1989).

Olga Veksler, "Efficient Graph-Based Energy Minimization Methods in Computer Vision", A Dissertation to the Faculty of the Graduate School of Cornell University, Aug. 1, 1999.

Office Action in EP Application No. 07813184.4 mailed Nov. 29, 2010.

International Preliminary Report on Patentability for PCT International Application No. PCT/US2007/079090, mailed Mar. 31, 2009, 11 pages.

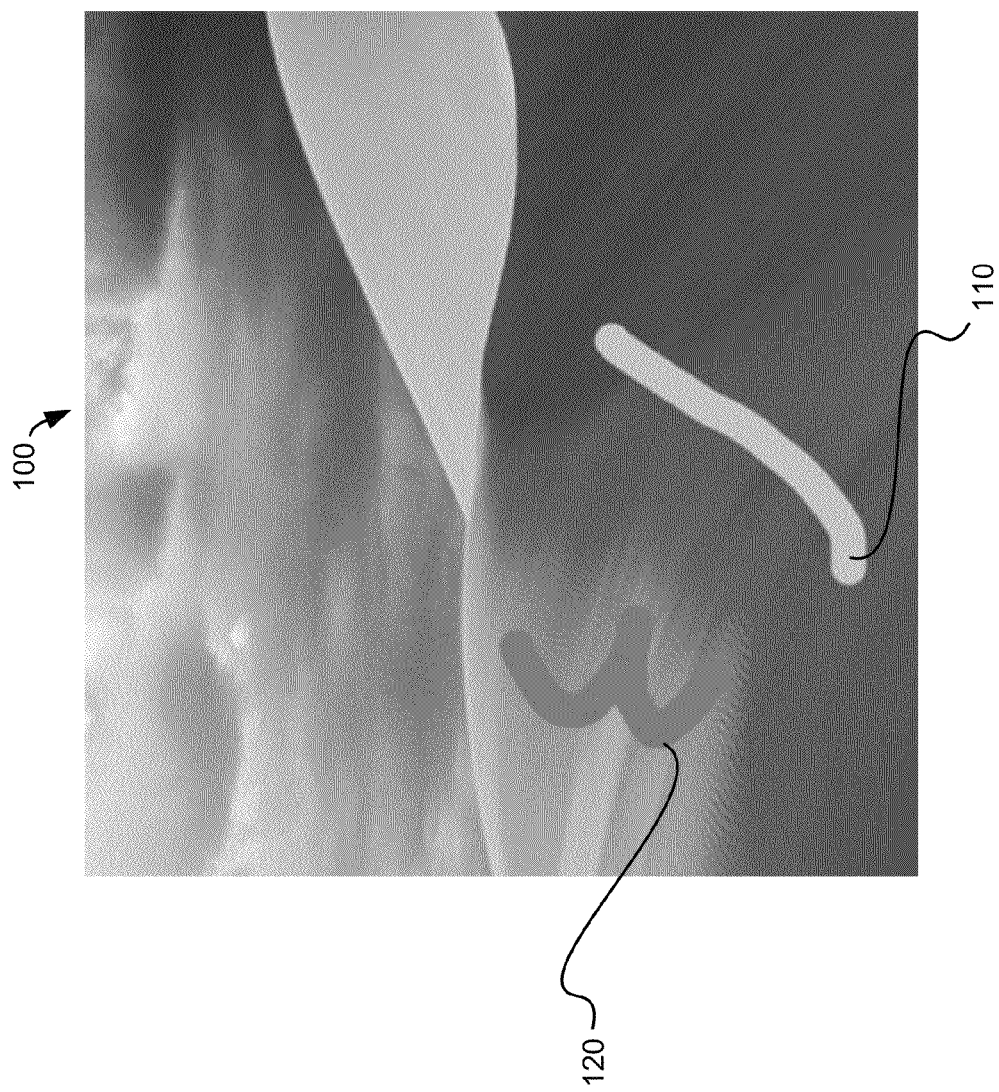

IMAGE MASKS GENERATED FROM LOCAL COLOR MODELS

CROSS-REFERENCE TO RELATED APPLICATIONS

This application claims priority to and is a continuation of U.S. application Ser. No. 11/607,206 filed on Dec. 1, 2006, now U.S. Pat. No. 8,013,870 which claims priority to U.S. Provisional Application No. 60/847,168 which was filed on Sep. 25, 2006; the disclosure of the prior applications are considered part of (and are incorporated by reference in) the disclosure of this application.

BACKGROUND

The present disclosure relates to graphical image processing and, in particular, selecting parts of an image.

Typically, for each pixel in an image, an image mask indicates whether each pixel is selected. Image masks are sometimes referred to as image mattes, selection masks or alpha channels. A binary mask is an image mask that can be used to indicate one of two mutually exclusive states for each pixel: selected or not selected, foreground or background, etc. An opacity mask, sometimes referred to as a graded opacity mask, is an image mask that indicates the degree to which each pixel is in one of two mutually exclusive states. The opacity mask can be used to indicate, for example, that some pixels are completely foreground or completely background, while other pixels are mostly foreground and slightly background. The degree to which a given pixel is identified by the opacity mask as foreground can be referred to as the pixel's opacity with respect to the opacity mask.

An opacity mask is often used to select areas of an image that depict objects having soft edges (e.g., edges that blend with other depicted objects or the background). Typically such objects include hair, fur, feathers, fire, smoke, and so forth. An opacity mask can be generated from a binary mask by artificially feathering or softening (e.g., blurring) the edges of the binary mask. However, the resultant opacity mask will typically feature uniformly softened edges that do not reflect the features (e.g., sharp edges) depicted in the image.

An opacity mask can also be generated for an image by selecting a range of colors or using a global color model of opacity that depends on the color of all pixels in the image. However, these techniques may yield an opacity mask that does not completely include the desired area.

SUMMARY

In general, in one aspect, embodiments feature receiving an image mask where the image mask identifies a first opacity value of pixels in a raster image. The first opacity value ranges between a value representing foreground and a value representing background. Each pixel in the image has a color. A first boundary pixel is identified in the image. A second opacity value for the first boundary pixel is determined using a first local color model of opacity. The first local color model of opacity is determined based on the colors of the pixels in the image within a local neighborhood of the first boundary pixel. Other embodiments of this aspect include corresponding systems, apparatus, and computer program products.

These and other embodiments can optionally include one or more of the following features. The image mask can be updated based on the second opacity value. A second boundary pixel can be identified in the image. A second local color model of opacity can be determined based on a color and a second opacity value of pixels within the local neighborhood of the second boundary pixel. A third opacity value can be determined for the second boundary pixel based on the second local color model.

The first local color model of opacity can be non-linear. The first local color model of opacity can be linear. The image mask can be a binary mask. The image mask can be an opacity mask. A border can be identified between foreground and background pixels. Determining the first local color model of opacity can include deemphasizing the contribution of color values of one or more pixels near the border while determining the first local color model of opacity, where the one or more pixels are in the local neighborhood of pixels. The first boundary pixel can be in a proximity to the identified border. User input can be received specifying the proximity. The first boundary pixel can be a pixel whose identified opacity value is within an opacity value interval. User input can be received specifying the interval.

Determining the first local color model of opacity can include identifying a function taking the color of a given pixel as an argument where the function's value is the opacity value of the given pixel and where the function is a sum of a plurality of terms. Each term is the product of a respective undetermined coefficient and a respective monomial that has one or more variables corresponding to each component of the given pixel's color. The first local color model of opacity at the boundary pixel is derived by determining the value of each coefficient in the function, where the derivation is based on the color and first opacity values of pixels in the neighborhood of pixels.

Determining the first local color model of opacity can include determining a second local color model of opacity based on the color of the pixels in the entire image and each pixel's respective first opacity value. The first local color model of opacity can be solved based on the second local color model of opacity and the colors of the pixels in the image within the local neighborhood of the first boundary pixel. The second local color model of opacity can be determined based on a lower resolution version of the image.

A low-resolution pixel can be identified in a lower resolution version of the image, where the low-resolution pixel corresponds to the boundary pixel. The local neighborhood of the boundary pixel can be one or more pixels in the lower resolution version of the image that are in proximity to the low-resolution pixel. A second local color model of opacity can be determined for the lower resolution version of the image and the first local color model of opacity can be determined based on interpolating the second local color model. Determining the second opacity value can include evaluating the first color model of opacity using the color of the first boundary pixel. The second opacity value for the first boundary pixel can be determined based on the first opacity value of the first boundary pixel.

In general, in another aspect, embodiments feature receiving user input identifying a plurality of pixels in an image. The image is defined by a raster of pixels. While receiving the user input, the following actions are performed one or more times: 1) an image mask is determined based on the identified pixels; 2) a boundary pixel is identified in the image; 3) an opacity value for the boundary pixel is determined using a local color model of opacity; 4) the image mask is updated based on the determined opacity value for the boundary pixel; and 5) a rendering of the image is updated on a display to depict the updated image mask as the user input is being received. Other embodiments of this aspect include corresponding systems, apparatus, and computer program products.

Determining the image mask can include coherently classifying pixels based on the received user input. Opacity values can be smoothed along edges in the image mask. The image mask can be snapped to color-edges in the image. The user input can be received as the user draws a stroke across the image. The rendering of the image on the display to depict the updated image mask can include one or more of: 1) highlighting pixels with either predominantly foreground or background opacity values; 2) obfuscating pixels the either predominantly foreground or background opacity values; 3) applying a filter to pixels whose opacity values are either predominantly foreground or background; 4) rendering the image mask, the image mask depicting the opacity value of each pixel; or 5) rendering a border of areas of pixels whose opacity values are either predominantly foreground or background.

Particular embodiments of the subject matter described in this specification can be implemented to realize one or more of the following advantages. A coherent opacity mask can be produced that features both hard and soft edges corresponding to hard or soft edges of objects depicted in an image. An accurate opacity mask can be produced with relatively little user input. The accuracy of image masks that do not fully capture depicted objects in an image can be improved. Binary image masks that have hard edges can be improved to yield continuous image masks which may feature both hard and soft edges. The edges of an opacity mask are determined based on the color properties of pixels near the edges, rather than the color properties of the entire image, thus producing more accurate edges and object selection. Generating or improving an image mask is computationally efficient enough to provide instantaneous feedback to the user, allowing the selection process to be interactive.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 illustrates an image with a foreground and a background brushstroke.

Like reference numbers and designations in the various drawings indicate like elements.

DETAILED DESCRIPTION

FIG. 1 illustrates an image 100 with a foreground brushstroke 110 and background brushstroke 120. In general, an image can be represented as a raster of pixels (e.g., a two dimensional array of pixels), where each pixel encodes values (e.g., color, intensity, or both) that describe the image at a particular location. Color images are typically specified in terms of a particular color space (e.g., RGB, CMYK, CIELAB, CIE XYZ, CIE LUV, YCC, YIQ, HSB, HSL, Grayscale, or black and white), which determines how the value of each pixel in the image can be interpreted as a color. For example, in an RGB encoded image, each pixel is encoded by at least three values corresponding to each of RGB's three color components: red, green and blue. In a grayscale image, a color corresponds to a level of intensity or shade of gray. In a black and white image, a color is either white or black.

Typically an image and its constituent pixels are described by and stored in a file having an image format such as the Joint Photographic Expert Group (JPEG) format, Portable Network Graphics (PNG) format, Graphic Interchange Format (GIF) format, Bitmap (BMP) format, Tagged Image File Format (TIFF) format, and others.

Two separate brushstrokes (e.g., 110 and 120) are shown superimposed on the image 100. The pixels that have been covered by a brushstroke are identified as being pixels in one of the two states represented by an image mask (e.g., foreground or background). For example, brushstroke 110 identifies foreground pixels while brushstroke 120 identifies background pixels.

An initial binary mask for the image 100 can be created that identifies pixels in the image as either background or foreground. Generation of a binary mask for the image 100 can vary among implementations. In some implementations, the foreground and background pixels identified by the user can be used to generate a binary mask. For example, a binary mask can be determined based on coherent classification, as described in U.S. patent application Ser. No. 11/517,189, entitled LIVE COHERENT IMAGE SELECTION, to Gregg Wilensky et al., which was filed on Sep. 6, 2006 and is incorporated by reference herein in its entirety. In other implementations a binary mask can be generated according to, for example, a flood fill that specifies a "filled" contiguous region of pixels where each pixel in the region has a color value in a particular range of colors (e.g., a range of colors corresponding to the color of the user identified pixels). Other implementations can generate a binary mask based on a color range selection, where pixels anywhere in the image are classified as foreground based on the degree to which their colors are within a predetermined range.

Figure 2B:
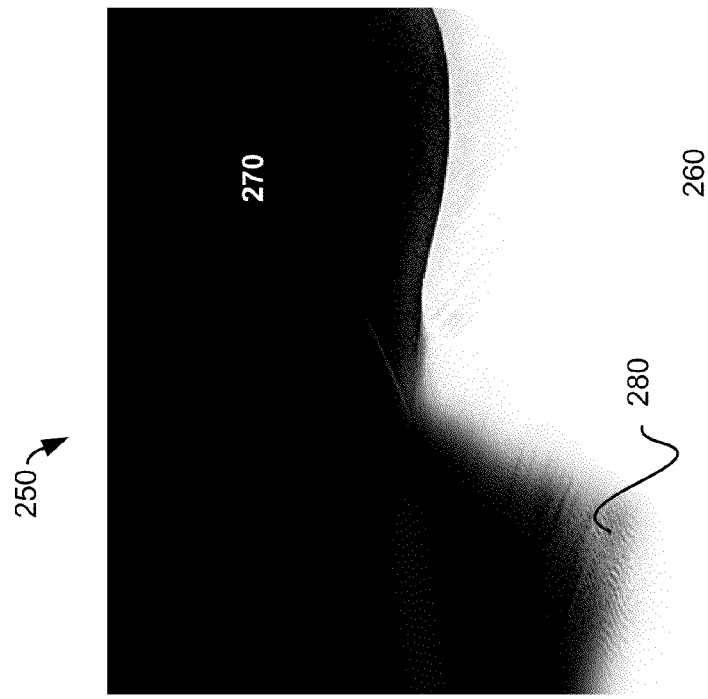
FIG. 2B illustrates a second image mask for the image in FIG. 1.
Figure 2A:
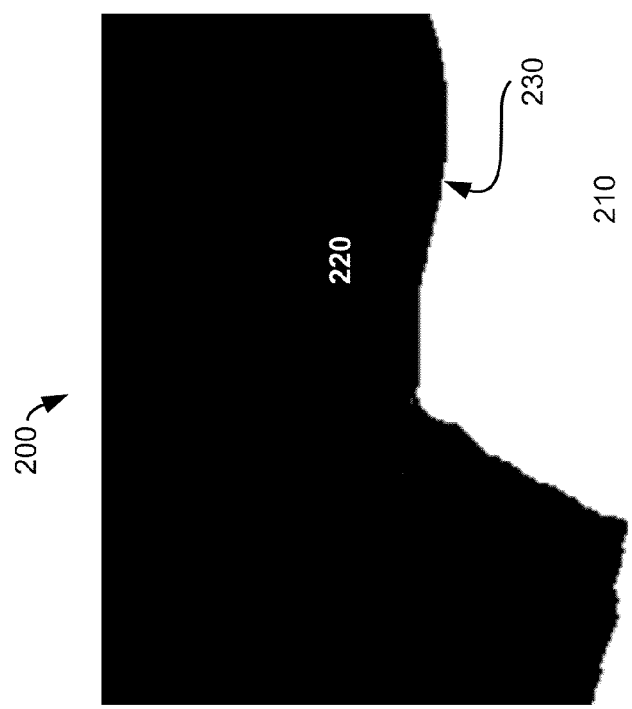
FIG. 2A illustrates a binary mask for the image in FIG. 1.

FIG. 2A illustrates a binary mask 200 for the image 100. The binary mask 200 includes foreground pixels 210, rendered in white, and background pixels 220, rendered in black. In general, a binary mask identifies whether a particular pixel in a corresponding image is foreground or background. In some implementations, a binary mask identifies whether a pixel is foreground or background based on an opacity value. For example, foreground pixels can be represented as having an opacity value of one, while background pixels can be represented as having an opacity value of zero. In other implementations, the particular opacity value of foreground and background pixels can include other values (e.g., 0 and 255, or −1 and 1 for background and foreground opacity values, respectively).

In contrast to binary masks where a pixel's opacity value is typically one of two discrete values representing foreground or background, a pixel's opacity value in an opacity mask ranges continuously between the discrete values. In some implementations, the opacity values in an opacity mask can be any value between, and including, zero and one. For example, an opacity value of 0.75 indicates that a pixel is mostly foreground (75%) and partly background (25%).

In some implementations, the opacity value of pixels in foreground and background regions of an image can be expressed as a foreground (+) projection function $\Pi_+(r)$ and a background (−) projection function $\Pi_-(r)$, where r is a pixel's spatial location in an image (e.g., r={x, y}, where x and y refer to the position of the pixel within the image raster). The value of each function at r is based on the opacity value of r in an initial mask, given as $\alpha_0(r)$. For example, in some implementations:

$\Pi_+(r) = \alpha_0(r)$ and $\Pi_-(r) = 1 - \alpha_0(r)$.

These functions are complementary such that at every value of r, the value of the sum of both functions is one:

$$\Pi_+(r) + \Pi_-(r) = 1. \quad (1)$$

The remainder of the specification, unless otherwise noted, assumes that opacity values in the initial mask have the aforementioned complementary property.

In FIG. 2A, the binary mask 200 has a hard, discrete border 230 where foreground pixels 210 are adjacent to background pixels 220. Along the border 230 foreground pixels abut background pixels in the mask 200. However, the border 230 is not necessarily representative of the object being masked or the boundaries of the object as they are depicted in the image 100. For example, on the left side of image 100, the shadowed portions of the dunes are not separated by a hard discernable edge.

An opacity mask that more accurately masks the edges of object boundaries in the image can be generated from the binary mask depicted in image 200. In general, a second image mask is an opacity mask generated from any initial image mask by reevaluating opacity values of pixels within particular regions of the initial image mask. Reevaluation of a given pixel is made with respect to the pixel's initial opacity value, as given by the initial image mask, and the color of the pixel and other pixels in the image. The second image mask more accurately captures the boundaries of objects depicted in the image, even if the objects have boundaries that are soft or difficult to discern (e.g., the edges of fire, smoke, fog, clouds, hair or fur). In some implementations, the initial and second image masks are represented with a common underlying image mask.

FIG. 2B illustrates a second image mask 250 for image 100, which can be determined based on the initial binary mask 200. The second image mask 250 features generally the same foreground and background areas as the binary mask 200, however the opacity values of pixels in regions near the border 230, such as region 280, have been improved. In particular, the opacity values of pixels in the region 280 more accurately reflect the edges of the object shown in the image 100.

In some implementations, a second image mask can be generated by reevaluating the opacity of pixels in boundary regions in an initial binary mask. Boundary regions are contiguous areas of pixels that are in proximity to a border where foreground and background pixels meet. For example, opacity values of both the foreground and background pixels near the border 230 are reevaluated based on the color characteristics of pixels in proximity to the border 230. In some implementations, all pixels within a predefined distance from a border, determined by a radius R and expressed as a quantity of pixels, can be reevaluated.

Figure 3:
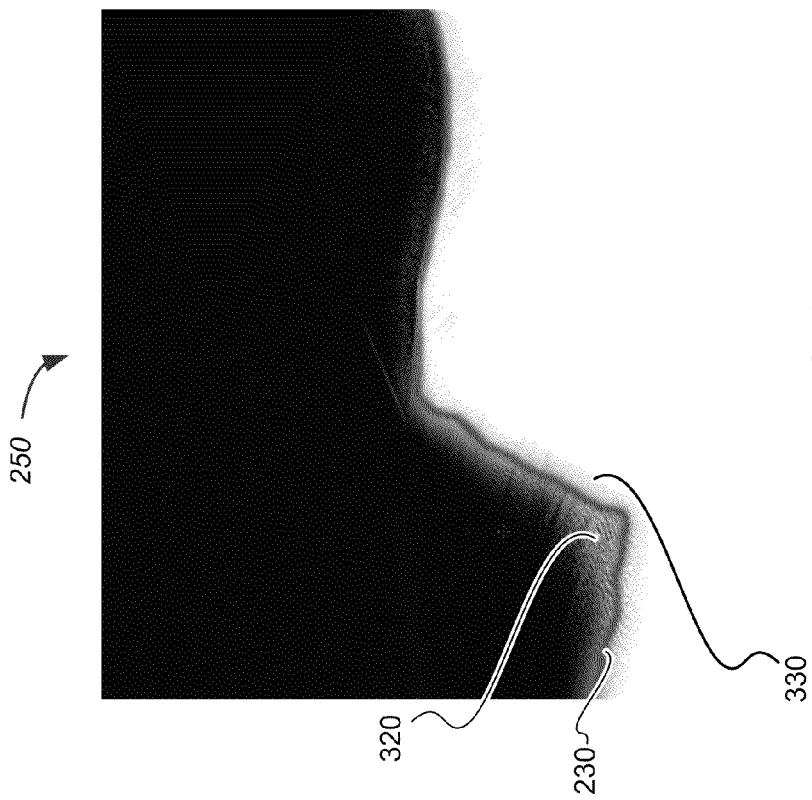
FIG. 3 illustrates the second image mask in FIG. 2B with a border.

FIG. 3 illustrates the second image mask 250 with the border 230 shown as a red line. As described above, the border 230 delineates where foreground and background regions meet in a binary mask (e.g., 200). Note that the opacity values of pixels on both sides of the border 230 have been adjusted. The pixels in the area 320 that were formerly identified as background pixels in the binary mask 200, are identified as partly foreground in the second image mask 250. Similarly, pixels in the area 330 that were identified as foreground pixels in the binary mask 200, are identified as partly background in the second image mask 250.

Figure 4:
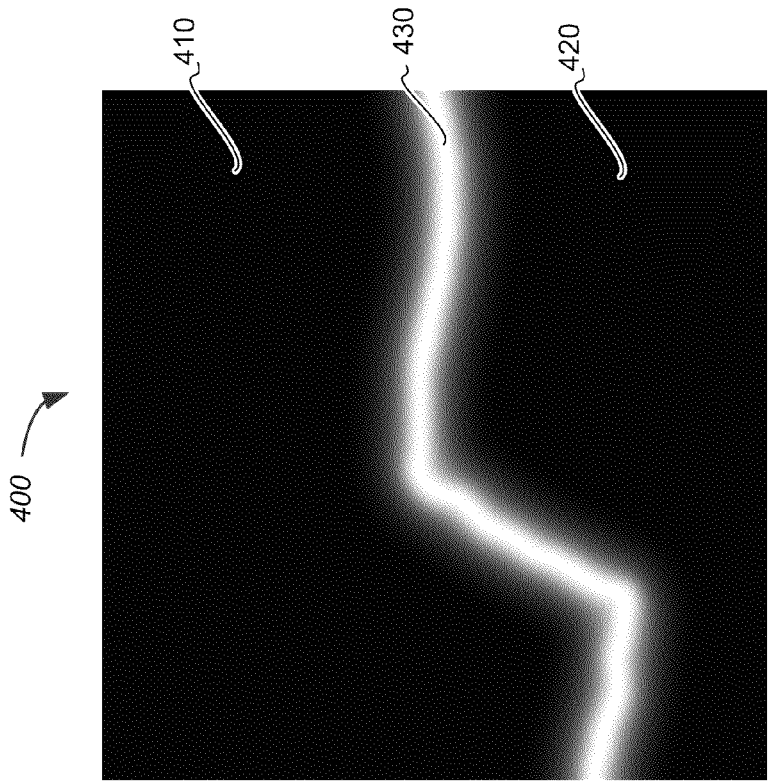
FIG. 4 illustrates a border mask based on the binary mask in FIG. 2A.

FIG. 4 illustrates a border mask 400 determined based on a binary mask. A border mask identifies a boundary opacity value for pixels represented in a binary mask (e.g., 200). The border mask 400 includes one or more boundary regions (e.g., 430), where each pixel is illustrated in shades of white proportional to the pixel's boundary opacity value. Pixels outside the boundary region (e.g. the regions 410 and 420), illustrated as black, include pixels that are not near a border and whose opacity values need not be reevaluated to determine a second image mask. The boundary opacity value of a pixel in a border mask effectively determines to what extent a pixel will retain its initial opacity value (e.g., as indicated by the initial image mask) in the second image mask. In some implementations, a pixel retains its initial opacity value in proportion to how far away the pixel is from a border (e.g., the border 230). For example, the opacity value of pixels that are not in a boundary region (e.g., pixels in the regions 410 and 420) can retain their initial opacity value in the second image mask. In contrast, the opacity values of pixels near the border (e.g., pixels in the region 430) are subject to reevaluation and will have potentially more accurate opacity values in the second image mask.

Figure 5:
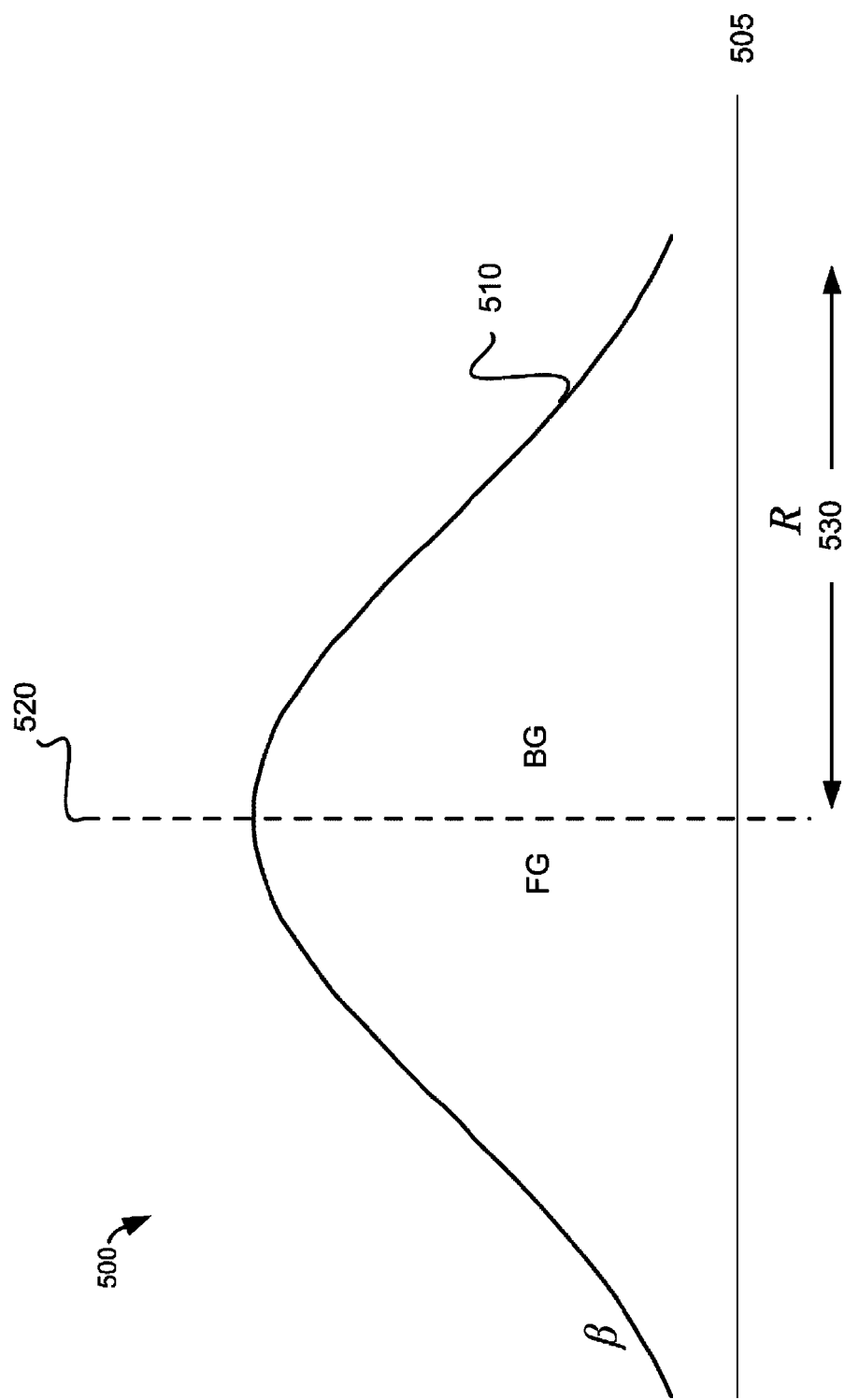
FIG. 5 is a graph of a border function.

FIG. 5 is a graph 500 of a border function β, which can be used to determine a border mask (e.g., the border mask 400). In some implementations, the border function can be a Gaussian function that generates an opacity value for a pixel based on how far the pixel is from the nearest border. In other implementations, the border function can be determined from a Euclidean Distance Transform function which measures the distance from each pixel to the nearest border pixel. A curve 510 of the graph 500 represents opacity values as a function of distance 505 from a border 520, which is represented by the dotted line. The distance over which β ranges depends on a radius R 530 (i.e., the distance of a pixel from the border 520). For example, the radius 530 corresponds to the width of the boundary region 430 illustrated in the border mask 400. The value of β at r is the boundary opacity value of the pixel r. As evident from the curve 510, in some implementations foreground and background pixels are subject to more significant reevaluation nearer to the border 520. Pixels that are away from a border, but within a boundary region, can retain some of their initial opacity value (e.g., a pixel's reevaluated opacity value and its initial opacity value can be blended to generate an improved pixel value).

Figure 6:
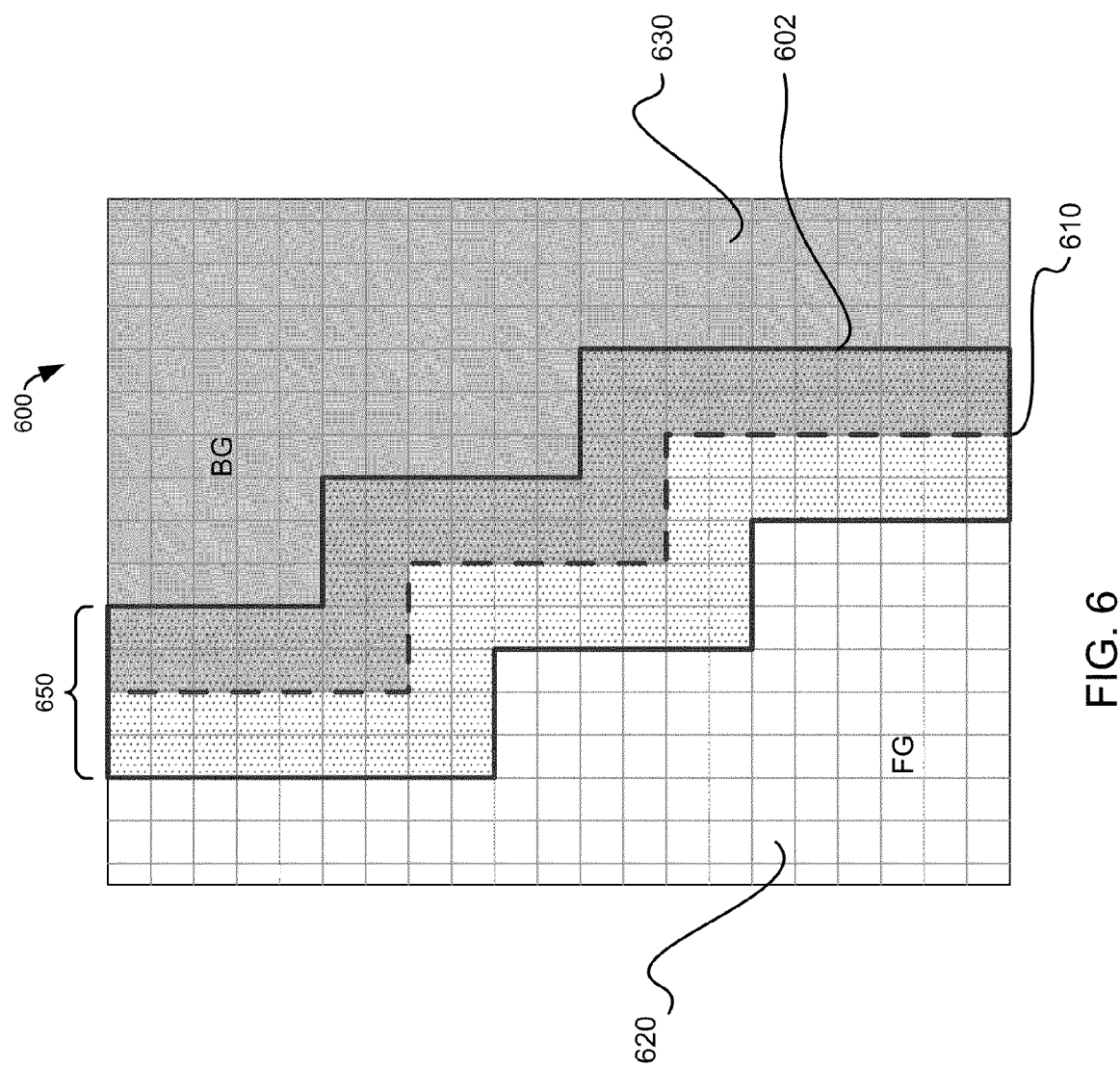
FIG. 6 illustrates pixels of a binary mask.

FIG. 6 is an illustration of pixels in a binary mask 600. A border 610, shown as a dashed line, indicates where foreground pixels and adjacent background pixels meet. A boundary region 650, illustrated as the pixels within the area 602, can be determined by identifying pixels in proximity to the border 610. In some implementations, the boundary region 650 can include any pixel that is within a particular distance, or radius, of the border 610. The boundary region 650, for example, includes pixels that are less than three pixels away from the border 610. In some implementations, this radius corresponds to the radius over which the function β is greater than zero (e.g., the radius 530). In general, other radius lengths are possible and the length of the radius can vary among implementations. In some implementations, the radius can be pre-determined, determined based on the size of the image, or specified based on user input.

Reevaluation of pixels within a boundary region can be based on a color model of opacity, similar to that described in U.S. patent application Ser. No. 11/524,219, entitled IMAGE MASK GENERATION, to Gregg Wilensky, which was filed on Sep. 19, 2006 and is incorporated by reference herein in its entirety. The color model of opacity is used to determine an opacity value for a given pixel. In some implementations, the color model of opacity, expressed in vector notation, has the following form:

$$\alpha(r) = \lambda \cdot \xi(r). \quad (1.5)$$

In equation (1.5), $\alpha(r)$ is the opacity value for pixel r, $\xi$ is a vector containing combinations of color components of the given pixel, and $\lambda$ is a corresponding vector of constant coefficients in the color model of opacity. Each element in $\xi$ is a unique product of a pixel r's color components. For example, a pixel in RGB color space can have color components of the following form: $r, g, b, b^2, gb^3, r^4$. For each color component in there is a respective coefficient in $\lambda$. The number color component combinations can be pre-determined, automatically determined, or specified based on user input. For an image in RGB color space and using second order color component combinations, for example, each vector in the color model of opacity can have the following form (where $w_n$ represents the nth coefficient in $\lambda$ and r, g, b, represents red, green and blue color components, respectively):

$$\lambda = \{w_0, w_1, w_2, w_3, w_4, w_5, w_6, w_7, w_8, w_9\} \text{ and}$$

$$\xi = \{1, r, g, b, r^2, rg, rb, b^2, bg, g^2\}.$$

In general, the number of color component combinations affects the fidelity of the opacity mask resultant from reevaluating pixels in the image. More color components typically lead to more expansive areas (e.g., of either foreground or background) and each area can contain a wider variation of colors.

In some implementations, the values of the coefficients in $\lambda$ can be determined by minimizing an error function given by:

$$\text{error} = \frac{1}{2}\int \{\Pi_+(r)[1 - \lambda \cdot \xi(r)]^2 + \Pi_-(r)[0 - \lambda \cdot \xi(r)]^2\}dr. \quad (2)$$

In equation (2), the foreground and background projection functions refer to each pixel's opacity value in an initial opacity mask. However, in some implementations, the foreground and background projection functions both have non zero values for pixels identified by a user (e.g., such as the brushstrokes depicted in FIG. 1 that identify particular pixels from the image 100). In such implementations, the foreground and background projection functions correspond to the foreground and background brushstrokes respectively and do not exhibit the complementary property stipulated above in equation (1). For example, the background projection function has the value one if r is identified as a background pixel and zero otherwise.

Using the error function given in equation (2), the coefficient vector $\lambda$ can be determined by the following function, where $\langle \ldots \rangle$ denotes an average of values over the enclosed variables (e.g., all pixels in the image):

$$\lambda = M^{-1} \cdot \langle \Pi_+(r)\xi(r) \rangle.$$

In the above equation, $M^{-1}$ is the inverse color correlation matrix defined as:

$$M = \langle [\Pi_+(r) + \Pi_-(r)]\xi(r)\xi(r) \rangle.$$

Or, after simplifying for the complementary opacity values:

$$M = \langle \xi(r)\xi(r) \rangle \text{ and}$$

$$\lambda = M^{-1} \cdot \langle \alpha_0(r)\xi(r) \rangle.$$

From the error function (2) given above, $\lambda$ is the coefficient vector that is based on the color values of all pixels in the image. Using this coefficient vector results in a global color model of opacity (see equation 1.5). However, if $\lambda$ is allowed to vary spatially from pixel to pixel the color model of opacity is effectively localized. A so-called local color model of opacity is based on the color of pixels within a particular spatial region of the image, rather than depending on the color of all pixels in the image. Thus, multiple local color models of opacity and each models' corresponding coefficient vector $\lambda'$ can be determined for each spatial region in an image. In some implementations, a coefficient vector $\lambda'$ can be computed for each pixel in an image.

The opacity value of pixels in an initial image mask can be evaluated based on a local color model of opacity using the following error function (revised from equation (2)):

$$\text{error} = \frac{1}{2}\int \{\gamma\beta(r)[\alpha(r) - \lambda'(r) \cdot \xi(r)]^2 + \quad (3)$$
$$\gamma'(1 - \beta(r))[\alpha(r) - \alpha_0(r)]^2 + (\nabla\lambda'(r))^2 + \lambda'(r) \cdot M^2 \cdot \lambda'(r)\}dr$$

In the above error function (3), $\alpha$ is the new opacity value of pixel r (e.g., in a second image mask). The first term includes values from a local color model of opacity, namely the local coefficient vector $\lambda'$ and color component vector $\xi$. The effect of the first term drives opacity values in the second image mask to agree with the local color model of opacity. The second term includes the initial opacity value $\alpha_0$ at pixel r. The effect of the second term drives opacity values to agree with their initial value, according to the initial opacity mask. The first and second terms are opposed to each other according to the border function β which affects the extent to which the new opacity value of a pixel r is determined by the local color model of opacity or by the pixel's initial opacity value. Comparing the curve of function β, as illustrated in FIG. 5, note that as the value of β gets smaller, the new opacity value of a pixel is driven primarily by the pixel's initial opacity value. When the value of β is zero (e.g., the pixel is outside of the boundary region), the pixel retains its initial opacity. In some implementations, pixels outside a boundary region can be ignored during determination of the second image mask. The values γ and γ' represent constant values that control the balance between the effect of the first and second term respectively.

The third term in the error function includes a gradient operator $\nabla$ which effectively serves to assure spatial smoothness of opacity values in the second image mask. The value of the gradient operator is larger in proportion to how rapidly the coefficient vector $\lambda$ changes with respect to r. In terms of the error function, the gradient operator assigns a penalty based on abrupt (e.g., large) changes in the value of coefficient vector.

In the fourth term, M is a constant diagonal matrix that has n rows and n columns for each n terms in the local color model of opacity. Each diagonal element in the matrix has the same constant value, $m^2$, except for the [0, 0] entry which is zero; this exception corresponds to the degenerate first value in the color component vector (e.g., $\xi_0(r)=1$). The matrix's constant diagonal value determines the spatial extent, measured in pixels, over which colors from the image influence the local color model of opacity. Pixels within the spatial extent are referred to as a neighborhood of pixels, in some implementations, around the pixel r.

The third and fourth terms effectively function as a smoothness constraint with respect to the new opacity value $\alpha$. The fourth term determines the size of the local neighborhood of pixels in proximity to r which are used to determine the value of the coefficient vector $\lambda'$. The third term ensures that the values of the coefficient vectors are smoothly varying over the image and prevents the coefficient values from changing rapidly from one pixel to the next. In some implementations, as the smoothness constraint dominates the first and second terms (e.g., when the values $\gamma$ and $\gamma'$ are both very small), the value of the coefficient vector approaches a constant image-wide value, similar to the coefficient vector that would be derived from equation (2).

To determine a new opacity value $\alpha$, the error function given in equation (3) is differentiated and minimized. To solve the equation, it can be differentiated with respect to each unknown variable, namely the coefficient vector $\lambda'$ and the new opacity value $\alpha$.

To solve for $\alpha$, the equation (3) can be differentiated as:

$$\alpha(r) = \frac{\gamma\beta(r)\lambda'(r)\cdot\xi(r) + \gamma'(1-\beta(r))\alpha_0(r)}{\gamma\beta(r) + \gamma'(1-\beta(r))}. \quad (4)$$

The above equation describes the new opacity value of pixel r as the contribution of the local color model of opacity and the contribution of the pixel's initial opacity value.

To solve for the value of the coefficient vector $\lambda'$, the equation (3) is differentiated as:

$$(-\nabla^2 + M^2 + \gamma_\beta(r)\xi(r)\xi(r))\cdot\lambda'(r) = \gamma_\beta(r)\alpha_0(r)\xi(r), \text{ where} \quad (5)$$

$$\gamma_\beta(r) = \frac{\gamma\beta(r)\gamma'(1-\beta(r))}{\gamma\beta(r) + \gamma'(1-\beta(r))}$$

Note that in equation (5), the color coefficient vector $\lambda'$ is a function of only the initial opacity value $\alpha_0$ of pixel r and the color component vector $\xi$. Both of these values are known given the pixel's opacity value in the initial opacity mask and the pixel's color in the image.

The value $\gamma_\beta$ is a function of both the border function $\beta$ and the values of $\gamma$ and $\gamma'$. In determining the value of the coefficient vector $\lambda'$ in the local color model of opacity, the value of $\gamma_\beta$ determines the extent to which the color value of a particular pixel affects the value of $\lambda'$ and the local color model of opacity. The value of $\gamma_\beta$ at r depends on the proximity of r to the border (e.g., because by definition, the value of $\beta$ is based on the proximity of r to the nearest border).

Figure 7:
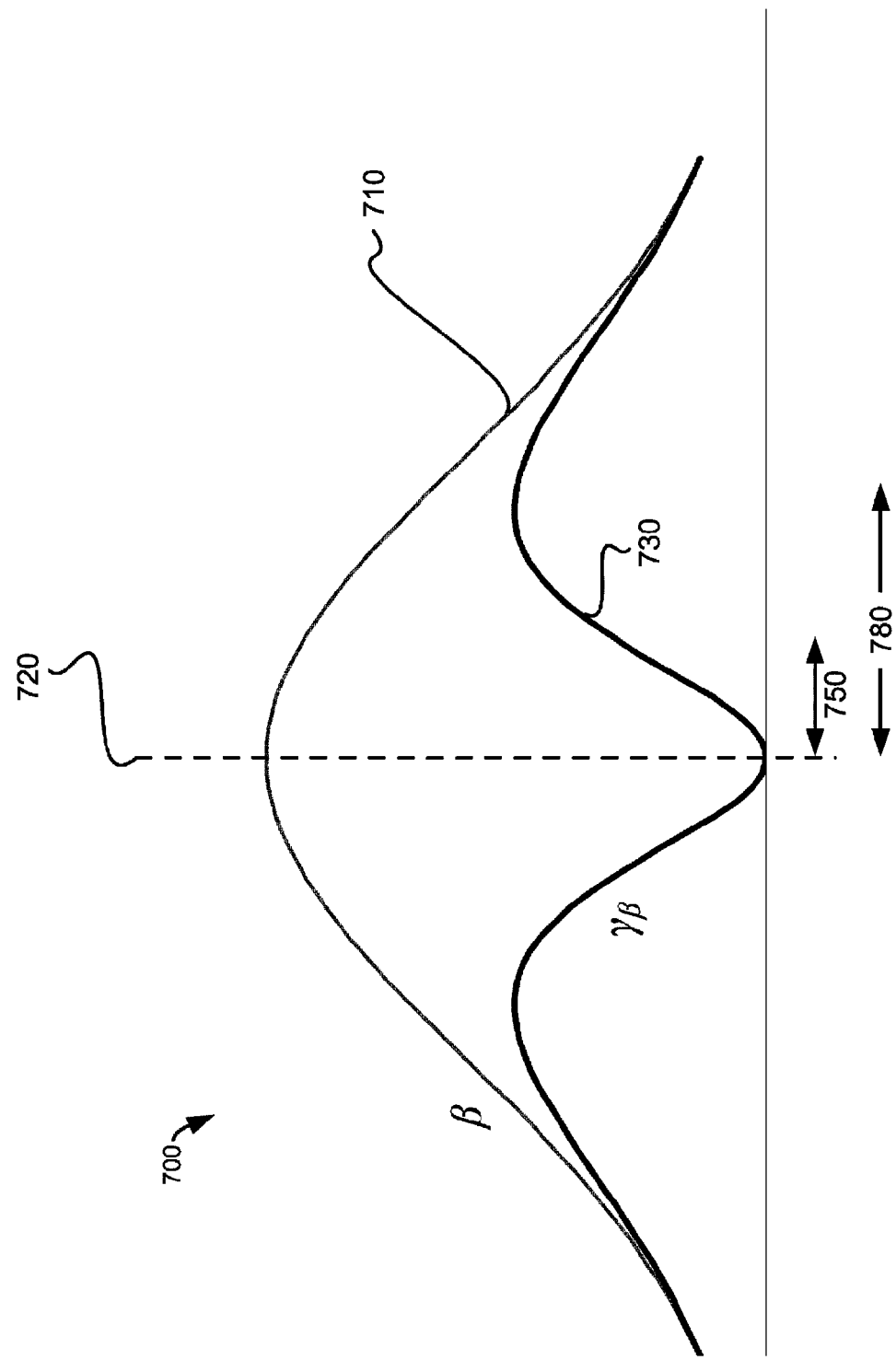
FIG. 7 is a graph of a function for determining which pixels in the image can be used to determine the local color model of opacity.

FIG. 7 is a graph 700 of a function $\gamma_\beta$ for determining which pixels in the image can be used to determine the local color model of opacity. The curve 730 describes the relative contribution of a pixel's color to the local color model of opacity. In some implementations, the curve 730 is based on the border function $\beta$ 710, illustrated for comparison. Both functions vary according to the distance of pixel r from a border, which is illustrated by the vertical dotted line 720. The curve 730 indicates that the color values of pixels nearest the border (e.g., within the distance 750) do not significantly contribute to the local color model of opacity. Pixels near the border are effectively deemphasized, for the purposes of determining the local color model of opacity, compared to pixels that are somewhat farther away from the border (e.g., at the distance 780). Recall that the initial opacity value of pixels determines the extent to which each pixel is considered foreground or background while determining the value of $\lambda'$. Consider that pixels near the border potentially can have color values that are uncharacteristic of their initial opacity value. For example, assuming the initial image mask is less than optimal, a pixel near the border is more likely to have an erroneous opacity value if the pixel shares color characteristics with the pixels on both sides of the border (e.g., nearby foreground and background pixels). In contrast, pixels further away from the border are more likely to have distinct color values. Using the color value of pixels that are away from the border 720 (e.g., at a distance 780) to determine the local color model of opacity can produce a more accurate local color model of opacity.

In equation (5), note that for a discrete raster of pixels in an image, the Laplacian operator $\nabla^2$, for a particular pixel expresses the difference between its operand $\lambda'$ and the mean of its operand $\lambda'$ over the local neighborhood of pixels. The local neighborhood of pixels can be the pixels in proximity to the particular pixel within a particular distance (e.g., the particular pixel plus four, nine, 21 or 25 adjacent pixels). In some implementations, the size of the neighborhood can be predefined, automatically determined, or specified based on user input. The relationship between $\nabla^2$ and the coefficient vector $\lambda'$ can be expressed as follows:

$-\nabla^2\lambda'(r)=4[\lambda'(r)-\langle\lambda'\rangle_N(r)]$, where $\langle\ldots\rangle_N$ denotes the mean of the enclosed quantity over N nearest pixels. Using this identity, equation (5) can be expressed in the following matrix equation:

$$(4+M^2+\gamma_\beta(r)\xi(r)\tau(r))\cdot\lambda'(r)=\gamma_\beta(r)\alpha_0(r)\xi(r)+4\langle\lambda'\rangle_N(r)$$

The above function can be solved by matrix inversion, which determines the coefficient vector $\lambda'$. The matrix typically contains relatively few non-zero entries, thus the particular method for inverting the sparse matrix can vary among implementations (e.g., the conjugate gradient descent method or the preconditioned conjugate gradient method).

In some implementations, the value of $\lambda'$ can be determined by iterative approximation which refines of the value of the coefficient vector over one or more iterations. Iterative approximation can include using an initial guess for the values of an initial coefficient vector $\lambda$ and then generating improved coefficient vectors in each iteration using the following equation, which is expressed in terms of each individual $a^{th}$ value in the improved coefficient vector $\lambda'$:

$$\lambda'_a(r) = \begin{cases} a=0: & \langle\lambda_a\rangle_N(r) + \chi(r)[\alpha_0(r) - \\ & \langle\lambda_a\rangle_N(r) - \mu\langle\lambda\rangle_N(r)\cdot\xi'(r)] \\ a\neq 0: & \mu\langle\lambda_a\rangle_N(r) + \mu\chi(r)[\alpha_0(r) - \\ & \langle\lambda_a\rangle_N(r) - \mu\langle\lambda\rangle_N(r)\cdot\xi'(r)]\xi'_a(r) \end{cases} \quad (6)$$

where $\xi'(r)$ refers to the color components of pixel r except for the first component which is equal to one. For example, $\xi'(r)=\{c_0, c_1, \ldots, c_{n+1}\}$ if $\tau(r)=\{1, c_0, c_1, \ldots, c_{n+1}\}$.

$$\mu = \frac{1}{1 + \frac{m^2}{4}} \text{ and} \quad (6.1)$$

$$\chi(r) = \frac{\frac{1}{4}\gamma_\beta(r)}{1 + \frac{1}{4}\gamma_\beta(r)(1 + \mu c^2)} \quad (6.2)$$

The initial value λ for the coefficient vector in equation (6) can be determined using the color model of opacity for entire image (e.g., as computed in equation (2)). The initial values of the coefficient vector serve as a seed to bootstrap iterative improvement of the coefficient vector. In each iteration, the improved coefficient vector can be used to generate an intermediate opacity mask for the image. Relaxation methods (e.g., successive over-relaxation or the methods proposed by Yousef Saad in 'Iterative Methods for Sparse Linear Systems', published in 1996 by PWS and incorporated by reference herein in its entirety) can be used to blend the values of the intermediate coefficient vector with the previously determined coefficient vector between iterations. The number of iterations can be pre-defined or based on user input, or can be automatically determined based on the extent of change between iterations (e.g., based on a measure of how much the opacity mask changes from one iteration to the next).

In some implementations, the opacity mask from which values $\alpha_0(r)$ are determined can be a blurred version of the initial opacity mask (e.g., a binary mask as shown in FIG. 2A). The extent that the initial mask is blurred is determined by a blur radius and, in some implementations, is a constant fraction of the border radius R. For example, the blur radius can be one third the length of the border radius. Blurring the initial opacity mask can help keep edges of the second image mask soft when the local color model of opacity may not be able to capture color differences given the initial opacity mask (e.g., where, in an image, there are few distinguishing color differences among pixels in the foreground compared to pixels in background areas).

Among implementations that receive a selection of pixels from the user that identify foreground or background areas (e.g., a brushstroke, as depicted in FIG. 1), the user identified pixels can be used directly to generate the second image mask. In such implementations, the foreground and background projection functions (e.g., $\Pi_+$ and $\Pi_-$) can refer to the foreground and background pixels that are identified in response to user input. In some implementations, the user input can be used in equation (2), above, to determine an initial coefficient vector λ (from which iterative improvements of the coefficient vector can be determined).

Alternatively, the foreground and background projection functions can be used directly in the error function given in equation (3) by replacing $\alpha_0(r)$ with the projection functions:

$$\text{error} = \frac{1}{2} \int \{\gamma\beta(r)[\alpha(r) - \lambda'(r) \cdot \xi(r)]^2 +$$
$$\gamma'(1 - \beta(r))[\Pi_+(r)(\alpha(r) - 1)^2 + \Pi_-(r)(\alpha(r))^2] +$$
$$(\nabla\lambda'(r))^2 + \lambda'(r) \cdot S^2 \cdot \lambda'(r)\} dr$$

This modification above does not otherwise affect how the coefficient vector is determined (e.g., the equation (5) is still applicable). However, the opacity values of pixels in the second image mask can be determined by the following modified equation:

$$\alpha(r) = \frac{\gamma\beta(r)\lambda'(r) \cdot \xi(r) + \gamma'(1 - \beta(r))\Pi_+(r)}{\gamma\beta(r) + \gamma'(1 - \beta(r))(\Pi_+(r) + \Pi_-(r))} \quad (7)$$

Figure 8:
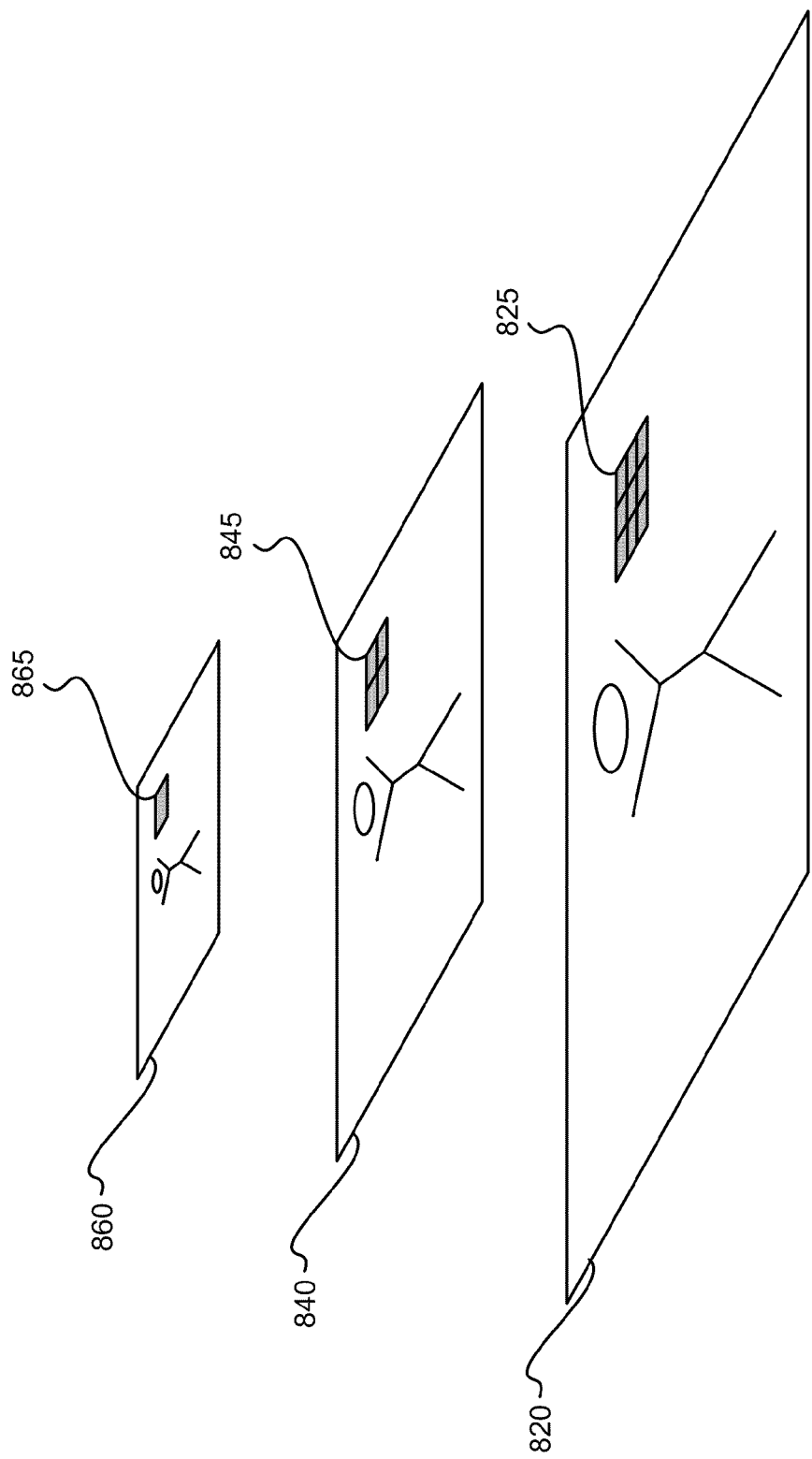
FIG. 8 illustrates a full-resolution image at multiple lower resolutions.

FIG. 8 is an illustration 800 of a full-resolution image 820 at multiple lower resolutions (e.g., image 840 and image 860). Each of the lower-resolution images contain representative content of the full-resolution image, for example, a pixel 865 in the image 860 corresponds to multiple pixels 845 in the image 840. Similarly, each pixel in image 840 corresponds to multiple pixels 865 in the full-resolution image 820. Each lower resolution image can be generated by down-sampling the full-resolution image 820. Down-sampling can be achieved by effectively using sampling methods such as linear interpolation, bi-cubic interpolation, or other image scaling or sampling techniques.

The full resolution image 820 is assumed to be the image of interest to the user. In some implementations, the image of interest is the image from which the opacity mask is based on, and which the user is ultimately interested in. Alternatively, the image of interest may be the particular image being displayed to the user, which itself may be a representation of an underlying image. In either case, the image of interest can be down-sampled one or more times producing lower resolution images such as image 840 or image 860. Other inputs that are relative to the image and used to generate an opacity mask (e.g., brushstrokes, initial binary or opacity mask) can also be down-sampled in a similar manner.

Lower-resolution images and their corresponding lower-resolution user-identified pixels and input mask can be used to determine the coefficient vector λ' of the local color model of opacity. For example, the coefficient vector can be determined based on the lower-resolution image 840 (e.g., by using equation (5)). The same coefficient vector can be used for determining the opacity values of pixels in the full-resolution image 820 (e.g., by using equation (4)). For a particular pixel in the full-resolution image 820, the coefficient vector for the corresponding pixel in the low resolution image can be used to determine the opacity for the particular pixel. For example, a coefficient vector can be determined for each pixel in the lower resolution image 860. Determining the opacity value of all nine pixels 825 in image 820 can be based on the same coefficient vector determined for the pixel 865 in the lower-resolution image 860.

In some implementations, local color models of opacity, and each model's coefficient vector, can be determined for each boundary pixel or group of boundary pixels in the lower-resolution image. The local color models of opacity based on the lower-resolution image can be interpolated to determined local color models of opacity for pixels in the full-resolution image. The interpolation can be determined by one or a combination of interpolation techniques including linear, bicubic, bilinear, nearest neighbor or other well-known interpolation techniques. An interpolated local color model of opacity may be used as a seed to iteratively improve the model (e.g., improve the model with respect to the full-resolution image).

Figure 9:
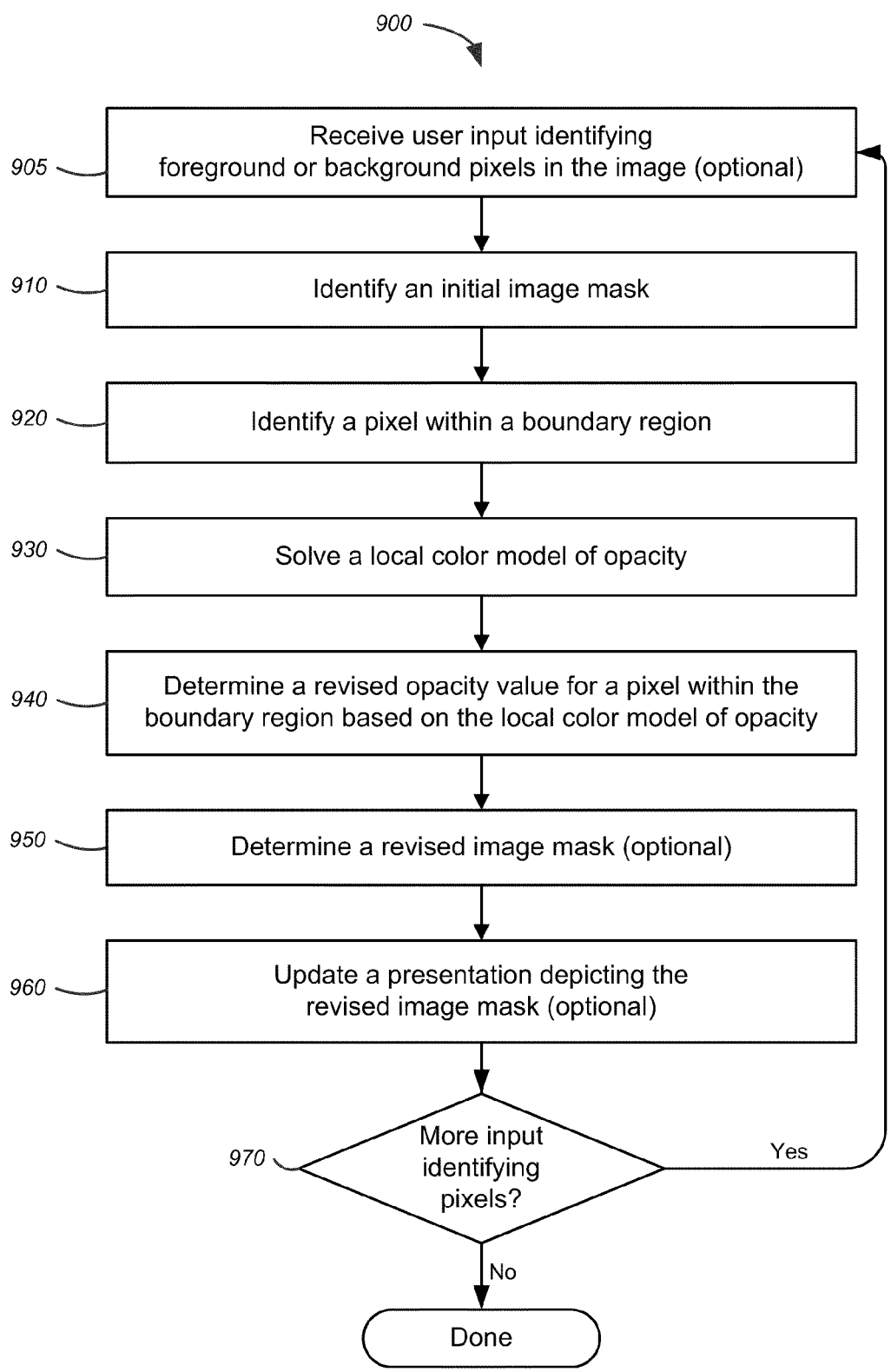
FIG. 9 is a flow diagram for improving an initial image mask.

FIG. 9 is a flow diagram of a method 900 for improving an initial image mask by using a local color model of opacity. The method 900 optionally includes receiving user input identifying pixels from an image as either foreground or background (step 905). Typically, such pixels are identified by a user based on received user input. For example, the user can draw a foreground brushstroke over the image using an input device (e.g., computer mouse, a touch sensitive screen, track pad, pressure sensitive tablet, or other device that can be used to identify a pixel in an image). The pixels that are covered by the foreground brushstroke are identified as foreground pixels.

The method 900 also includes identifying an initial image mask (step 910). In some implementations this includes receiving user input identifying pixels, as in step 905, and determining an initial image mask based on the user input. For example, an initial binary mask can be generated by coherently classifying pixels in the image based on identified pixels. Alternatively, a pre-determined initial image mask can be identified.

In some implementations, when the initial image mask is a binary mask (e.g., generated by coherently classifying pixels in the image), intermediate processing can be performed to refine the binary image-mask before improvement. Intermediate processing can include smoothing the binary mask using, for example non-linear diffusion, which preserves the shape of the initial mask while smoothing the opacity values along the edges where foreground and background areas meet. This smoothing technique is sometimes known as curvature-based motion. In some implementations, smoothing the binary mask will produce an opacity mask. The mask can be further refined by snapping the mask to color-edges in the image using level-set methods. This snapping technique is sometimes referred to as flowing-to-edges. Snapping the mask to color-edges increases the likelihood that a pixel in the border region is in proximity to an edge depicted in the image. Both smoothing and snapping are described in '*Level Set Methods and Fast Marching Methods*', by J. A. Sethian (1999), which is incorporated by reference herein in its entirety.

The method 900 includes identifying a pixel within a boundary region (step 920). Using the initial image mask a border is identified (e.g., the adjacency between two pixels that are each identified as foreground and background in an initial binary mask). The boundary region includes all pixels within a pre-determined or user specified distance of the identified border.

A local color model of opacity is solved for each identified pixel, or alternatively, solved for a contiguous group of identified pixels (step 930). Solving the local color model of opacity for the identified pixel includes identifying the value of the coefficient vector based on the color of pixels in a neighborhood of pixels. The neighborhood of pixels can include the identified pixel.

The coefficient vector of the local color model of opacity is used to determine a revised opacity value for the identified pixel (step 940). The revised opacity value is based on the coefficient vector, the previous opacity value and can also be dependant on how close the identified pixel is to the identified border within the initial image mask.

The method 900 can also include determining a revised image mask based on the revised opacity values of pixels identified in the boundary region (step 950). In the revised image mask, pixels outside of the boundary region retain their opacity values identified in the initial image mask, while pixels inside the boundary region are given their respective revised opacity value.

In some implementations, feedback can be provided to the user while user input is received. Feedback includes updating a presentation of the image or the image mask to depict the revised image mask (step 960). For example, pixels of the image which have predominantly background opacity values (e.g., opacity value less than 0.5) can be obfuscated (e.g., rendered in a grey, or colored hue proportional to their opacity value). Updating the presentation allows the user to discern the how the image mask has been generated or revised, and to adjust their input accordingly. In some implementations, the feedback may be artificially delayed with respect to the user input being received. For example, the revised image mask may be presented after a moment of inactivity or in response to a signal that the user input has ended (e.g., mouse-button release).

In some implementations, determining the revised opacity mask and updating a presentation of the image or image mask occurs as the user input is received. If additional user input is received (step 970), then the additional user input can be processed (step 905). When the desired opacity mask has been reached, the revised image mask can, in general be used for subsequent image processing operations (e.g., selection or transformation) which is typically applied to a pixel in proportion to opacity value of the pixel (e.g., foreground pixels are subject to the full effect of the image processing operation).

Figure 10:
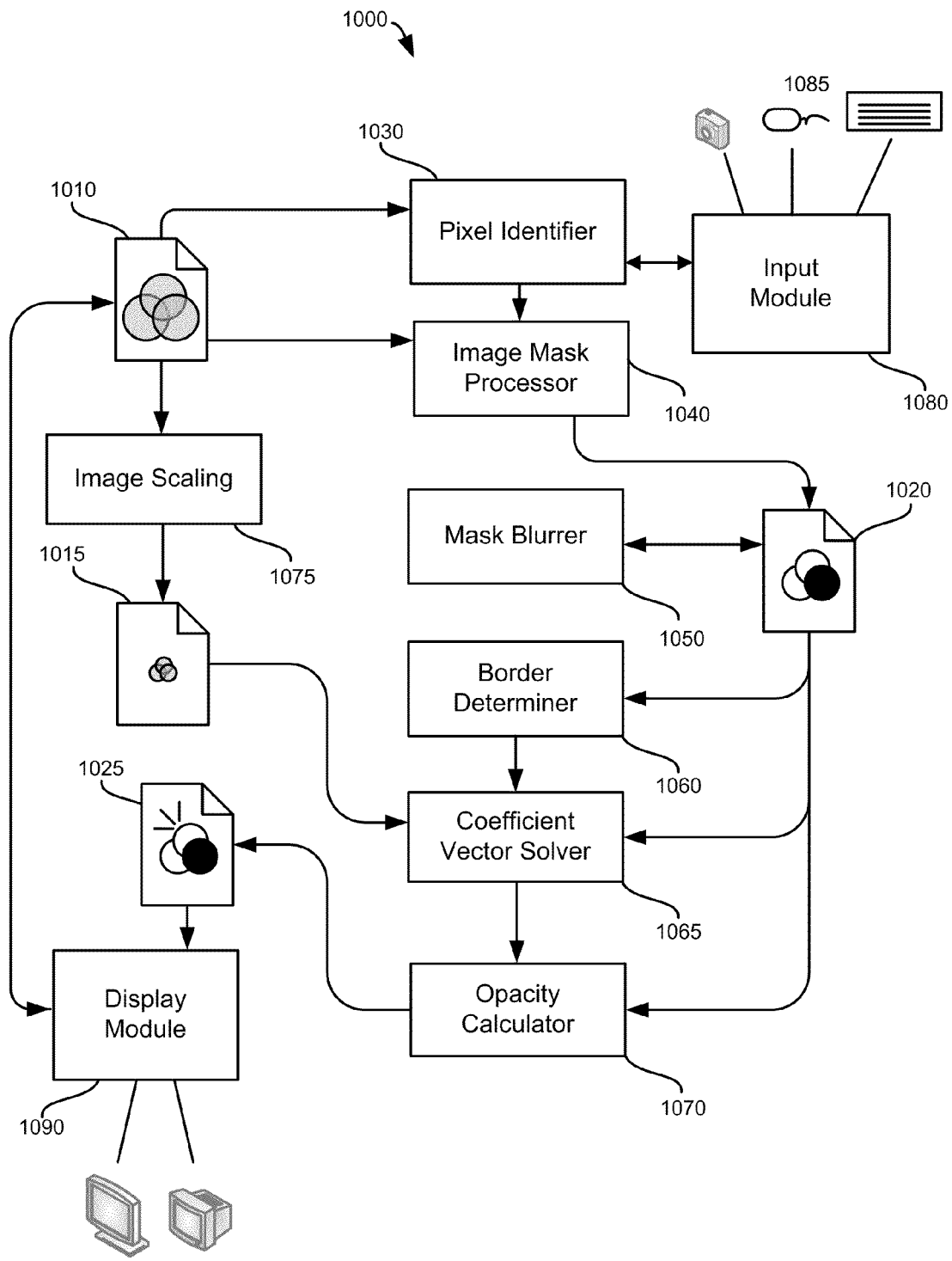
FIG. 10 illustrates an exemplary system for improving an initial image mask.

FIG. 10 illustrates an exemplary system 1000 for improving an initial image mask by using a local color model of opacity. The local color model of opacity is used to reevaluate the opacity value of pixels within one or more boundary regions of the initial image mask.

The system 1000 generally consists of modules (e.g., modules 1030) and resources (e.g., resource 1010). A module is typically a unit of distinct functionality that can provide and receive information to and from other modules. Modules can facilitate communication with input 1085 or output devices 1095 (e.g., display module 1090 or input module 1080). Modules can operate on resources. A resource is a collection of information that can be operated on by a module.

The system 1000 identifies an image 1010 that includes a raster of pixels for which opacity values can be determined. The opacity values for every pixel in the image 1010 constitute an opacity mask 1020. The opacity mask 1020 can be a separate resource from the image 1010, however, in some implementations, one or more opacity masks can be represented within the image resource 1010. An image scaling module 1075 can scale the image 1020 to generate a lower-resolution version of the image 1015.

The system 1000 includes an input module 1080 for receiving pixel identifications from users (e.g., foreground and background pixels). The input module 1080 can receive input from one or more input devices 1085 (e.g., keyboard, mouse, tablet, track pad, microphone for capturing sound or voice commands, camera for capturing user gestures, or physiological sensors). The input module 1080 can also determine the particular state of the pixel identifications (e.g., foreground or background). For example, users can denote whether the input is foreground or background by selecting a classification state (e.g., toggling a foreground/background button) or by altering the input (e.g., using left versus the right mouse button, or the particular pen used to provide input on a tablet). In other implementations, the input module 1080 can receive pixel classifications from a system automatically (e.g., based on the identifications made by motion detection, edge detection or machine vision systems), which, for example, can be determined from one or a series of images received from a camera 1085.

A pixel identifier 1030 can receive the classified pixels from the input module 1080. The pixel identifier 1030 can automatically identify pixels in the image having an opposite identification from the pixels received from the input module 1080. Information that identifies both the foreground and background pixels in the image 1010 can be provided to an image mask processor 1040. The image mask processor 1040 generates an initial image mask 1020 from the classified foreground and background pixels. In some implementations the image mask processor can use the classified pixels to coherently classify the image to produce a binary mask for the image. In other implementations, the image mask processor may generate an initial mask, either an opacity mask or a binary mask, based on other suitable techniques. Alternatively, an initial image mask 1020 can be provided to the system 1000 without being generated by the image mask processor 1040. For example, the initial mask may be received as a resource (e.g., identified by the user), generated from a template or received from another system or process.

In some implementations, a mask blurrer component 1050 can perform preliminary image processing of the initial image mask 1020. For example, the initial image mask 1020 can be blurred based on the border radius R. Blurring the initial image mask 1020 can produce an opacity mask from a binary mask (e.g., regions in proximity to where foreground and background meet in the initial binary mask are blurred in the resultant opacity mask). Modules that subsequently access the image mask 1020 receive the blurred mask.

A border determiner 1060 generates a border mask that identifies one or more borders and corresponding boundary regions from the initial image mask 1020. If the initial image mask 1020 is a binary image mask, the border determiner identifies regions in proximity to where foreground and background pixels meet in the binary mask. If the initial image mask 1020 is an opacity mask, the border determiner can identify a border based on a threshold of opacity values in the initial mask (e.g., all pixels having opacity value greater than 0.45 and less than 0.55 are in the boundary region). Alternatively, a threshold map can be generated from the opacity mask (e.g., all values greater than 0.5 are foreground, and all values less than 0.5 are background) from which a border can be identified similar to how a border is identified in a binary mask. The border mask can be generated based on the distance of pixels in the initial mask from the identified border. For example, the opacity value β of pixel r in the border mask may be given by:

$\beta(r)=(1-D(r)/R)^k$, where $D(r)$ is the distance of pixel r from the nearest border and as long as $D(r)$ is less than R. If $D(r)$ is greater than R then $\beta(r)$ is zero.

In the above equation, R is the border radius and k is a pre-defined constant.

The border mask, initial image mask 1020 and image 1010 or the lower-resolution image 1015 can be used by the coefficient vector solver 1065 to determine the value of the coefficient vector λ' for pixels in the lower-resolution image 1015. Values of the coefficient vector λ', the border mask, the initial image mask 1020 and the image 1010 are used by the opacity calculator 1070 to determine the opacity values for a resultant image mask 1025. The resultant image mask 1025, compared to the initial image mask 1020, is ideally an improved image mask.

Information about the resultant image mask 1025 and information about the image 1010 can be used by the display module 1090 to generate a visual rendering of the image mask 1025 and the image 1010. In some implementations, pixels that have background opacity values are highlighted or obfuscated in the visual rendering. In other implementations, an animated dotted line (e.g., marching ants, or a marquee) can be visually rendered to depict a separation between foreground and background regions in the image mask 1025. In other implementations, the areas of image that are predominantly foreground or background, as identified by the opacity mask, can be filtered by an image filter before rendering (e.g., background pixels are blurred or transformed from color to grayscale). Rendering foreground and background pixels of the image differently allows users to distinguish the effect of their input on the opacity mask.

Alternatively, the image mask 1025 can be rendered directly (e.g., as a monochrome image where the intensity of each pixel corresponds to the opacity value of each pixel in the image mask). In some implementations, information from the pixel identifier 1030 can also be used to render the pixels identified by the user (e.g., to present the brushstrokes over the image). The display module 1090 can be connected to one or more display devices 1095.

The system 1000 describes one potential implementation for generating an opacity mask from a non-linear color model of opacity. In general, modules and resources can be combined or divided and implemented in some combination of hardware or software on one or more computing devices connected by one or more networks.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results.

What is claimed is:

1. A computer-implemented method comprising:
   receiving an image mask, the image mask identifying first opacity values for pixels in an image, each pixel in the image having a color;
   identifying a first boundary pixel based on the image mask;
   determining, by a computing system, a plurality of weights by minimizing an error function that is based on the colors and the first opacity values of pixels within a local neighborhood of the first boundary pixel in the image;
   determining, by the computing system, a second opacity value for the first boundary pixel using a weighted sum, wherein the weighted sum combines the weights with corresponding products of color components of the first boundary pixel; and
   updating the image mask based on the second opacity value for the first boundary pixel.

2. The method of claim 1, wherein each first opacity value ranges between a value representing foreground and a value representing background, and identifying the first boundary pixel comprises identifying a border between foreground and background pixels.

3. The method of claim 2, wherein each first opacity value is either the value representing foreground or the value representing background.

4. The method of claim 1, wherein the error function includes a smoothness constraint with respect to the second opacity value.

5. The method of claim 1, wherein evaluating the weighted sum of products includes evaluating a function of the form $\alpha(r)=\lambda \cdot \xi(r)$, wherein r represents the first boundary pixel, $\alpha(r)$ represents the second opacity value for the first boundary pixel r, $\lambda$ represents a vector of the weights, and $\xi(r)$ represents a vector of the products of color components for the first boundary pixel r.

6. The method of claim 5, wherein the vector of the weights has the form $\lambda=\{w_0, w_1, w_2, w_3, w_4, w_5, w_6, w_7, w_8, w_9\}$, wherein $w_0, w_1, w_2, w_3, w_4, w_5, w_6, w_7, w_8$, and $w_9$ represent the weights, and the vector of the products of color components for the first boundary pixel r has the form $\xi(r)=\{1, R, G,$ B, $R^2$, RG, RB, $B^2$, BG, $G^2$}, wherein G represents a green color component for the first boundary pixel r, B represents a blue color component for the first boundary pixel r, and R represents a red color component for the first boundary pixel r.

7. A computer program product, encoded on a non-transitory computer-readable medium, operable to cause data processing apparatus to perform operations comprising:
receiving an image mask, the image mask identifying first opacity values for pixels in an image, each pixel in the image having a color;
identifying a first boundary pixel based on the image mask;
determining a plurality of weights by minimizing an error function that is based on the colors and the first opacity values of the pixels within a local neighborhood of the first boundary pixel in the image;
determining a second opacity value for the first boundary pixel using a weighted sum, wherein the weighted sum combines the weights with corresponding products of color components of the first boundary pixel; and
updating the image mask based on the second opacity value for the first boundary pixel.

8. The computer program product of claim 7, wherein each first opacity value ranges between a value representing foreground and a value representing background, and identifying the first boundary pixel comprises identifying a border between foreground and background pixels.

9. The computer program product of claim 8, wherein each first opacity value is either the value representing foreground or the value representing background.

10. The computer program product of claim 7, wherein the error function includes a smoothness constraint with respect to the second opacity value.

11. The computer program product of claim 7, wherein evaluating the weighted sum of products includes evaluating a function of the form $\alpha(r)=\lambda \cdot \xi(r)$, where r represents the first boundary pixel, $\alpha(r)$ represents the second opacity value for the first boundary pixel r, $\lambda$ represents a vector of the weights, and $\xi(r)$ represents a vector of the products of color component for the first boundary pixel r.

12. A system comprising:
a display device;
a computer program product encoded on a computer-readable medium; and
one or more processors operable to execute the program product and perform operations comprising:
receiving an image mask, the image mask identifying first opacity values for pixels in an image, each pixel in the image having a color;
identifying a first boundary pixel based on the image mask;
determining a plurality of weights by minimizing an error function that is based on the colors and the first opacity values of pixels within a local neighborhood of the first boundary pixel in the image;
determining a second opacity value for the first boundary pixel using a weighted sum, wherein the weighted sum combines the weights with corresponding products of color components of the first boundary pixel; and
updating the image mask based on the second opacity value for the first boundary pixel.

13. The system of claim 12, wherein each first opacity value ranges between a value representing foreground and a value representing background, and identifying the first boundary pixel comprises identifying a border between foreground and background pixels.

14. The system of claim 13, wherein each first opacity value is either the value representing foreground or the value representing background.

15. The system of claim 12, wherein the error function includes a smoothness constraint with respect to the second opacity value.

16. The system of claim 12, wherein using the weighted sum of products includes evaluating a function of the form $\alpha(r)=\lambda \cdot \xi(r)$, where r represents the first boundary pixel, $\alpha(r)$ represents the second opacity value for the first boundary pixel r, $\lambda$ represents a vector of the weights, and $\xi(r)$ represents a vector of the products of color component for the first boundary pixel r.

* * * * *